US008014373B2

(12) United States Patent
Malak et al.

(10) Patent No.: US 8,014,373 B2
(45) Date of Patent: Sep. 6, 2011

(54) FILTERED ANTENNA ASSEMBLY

(75) Inventors: Stephen P. Malak, Manlius, NY (US); Steven K. Shafer, Chittenango, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 888 days.

(21) Appl. No.: 11/857,558

(22) Filed: Sep. 19, 2007

(65) Prior Publication Data

US 2009/0073949 A1 Mar. 19, 2009

(51) Int. Cl.
*H04L 5/00* (2006.01)
*H04B 1/18* (2006.01)

(52) U.S. Cl. ......... 370/339; 370/297; 455/293; 455/327

(58) Field of Classification Search .......... 370/278–297, 370/339–350; 375/219–340; 343/702–850; 455/558–575, 274–293, 127–147, 313–327; 709/202–219

See application file for complete search history.

(56) References Cited

U.S. PATENT DOCUMENTS 3,656,162 A 4/1972 Mee
4,206,428 A 6/1980 Kaegebein
5,148,279 A 9/1992 Gabor
5,267,234 A 11/1993 Harrison
5,276,914 A * 1/1994 Ishizuka et al. ................. 455/83
5,594,454 A 1/1997 Devereux et al.
5,896,073 A * 4/1999 Miyazaki et al. ............. 333/204
6,101,102 A * 8/2000 Brand et al. .................... 363/15
6,147,572 A 11/2000 Kaminski et al.
6,163,568 A * 12/2000 Lansford et al. .............. 375/219
6,188,446 B1 2/2001 Aitken
6,374,094 B1 * 4/2002 Zappala ..................... 455/188.1
6,617,940 B2 9/2003 Stenberg
6,658,263 B1 12/2003 Ke et al.
6,721,543 B1 4/2004 Katsura et al.
6,774,857 B2 8/2004 Frank
6,937,845 B2 8/2005 Watanabe et al.
7,057,472 B2 6/2006 Fukamachi et al.
7,133,607 B2 * 11/2006 Clark .............................. 396/56
7,164,897 B2 * 1/2007 Manku et al. ................. 455/293
2004/0048585 A1 * 3/2004 Snyder et al. .............. 455/115.1
2006/0109067 A1 5/2006 Shtrom
2006/0148438 A1 * 7/2006 Manku .......................... 455/313
2006/0152303 A1 * 7/2006 Liang et al. ................... 333/134
2006/0246861 A1 * 11/2006 Dosanjh et al. ............... 455/147
2007/0129031 A1 * 6/2007 Newton et al. ............. 455/127.2
2007/0142019 A1 * 6/2007 Mattisson et al. ............ 455/327
2008/0273579 A1 * 11/2008 Rofougaran et al. ......... 375/219
2009/0207945 A1 * 8/2009 Sasaki et al. .................. 375/340
2009/0310725 A1 * 12/2009 Gao et al. ...................... 375/350

FOREIGN PATENT DOCUMENTS

EP 0 108 341 5/1984
JP 2000 13262 1/2000

* cited by examiner

OTHER PUBLICATIONS

Wibberduck©—5 —Router Range Extender Antenna http://www.radiolabs.com/products/antennas/2.4gig/Wibberduck5.php.

*Primary Examiner* — Man Phan
(74) *Attorney, Agent, or Firm* — Schmeiser, Olsen & Watts, LLP

(57) ABSTRACT

An antenna assembly for a wireless communications device has an antenna, a filter circuit, and a connector constructed to engage a wireless communications device. A filter circuit includes a band-pass filter and a first notch filter disposed in serial electrical communication with the band-pass filter, the band-pass filter operable to permit the passage of oscillatory electrical signals in a first frequency range, the first notch filter operable to impede the passage of oscillatory electrical signals in a second frequency range, the second frequency range residing within the first frequency range.

12 Claims, 4 Drawing Sheets

FILTERED ANTENNA ASSEMBLY

BACKGROUND OF THE INVENTION

These descriptions relate generally to antenna assemblies for engaging the antenna connectors of wireless communications devices, and relate more particularly relate to antenna assemblies having filter circuits within compact constructions.

Wireless internet-service routers typically exchange data with one or more computing devices by way of an antenna connected to the router. A router typically has one or more antenna connectors for engaging the antenna. A router may have on-board filter circuits, but on-board filter circuits are typically adapted to convey out-going and incoming data traffic, within the router, between the antenna and the transmit and receive circuit portions of the router. The on-board filter circuits are not successful in all environments with regard to suppressing interference signals generated by other devices. For example, wireless internet-service routers are susceptible to performance degradation due to the unwanted presence of interference signals coming from other devices such as microwave ovens and cordless telephones. Ironically, the very environments to which wireless routers are adapted to provide convenience, environments such as homes and offices, are typically inhabited by these other devices that generate unwanted interference signals.

Thus, a need exists for an improved antenna assembly that includes a filter circuit to facilitate the use of a wireless communications device in an environment where interference sources reside. A clutter-free and easily installed assembly that pre-filters interference signals from data traffic at the antenna stage of data routing is needed.

BRIEF SUMMARY OF THE INVENTION

The present invention addresses the above needs and enables other advantages, by providing antenna assemblies having filter circuits. For example, according to at least one aspect of the invention, an antenna assembly for a wireless communications device includes an antenna, a filter circuit in electrical communication with the antenna, and a connector in electrical communication with the filter circuit. The connector is constructed to dispose a wireless communications device into electrical communication with the filter circuit by engaging the wireless communications device. The antenna assembly is capable of at least wirelessly receiving data by way of the antenna and providing the received data to the wireless communications device by way of the antenna and the connector when the connector engages the wireless communications device. The filter circuit may include a band-pass filter operable to permit the passage of oscillatory electrical signals between the antenna and the connector in a first frequency range. The filter may also include a first notch filter operable to impede the passage of oscillatory electrical signals in a second frequency range which is within the first frequency range.

In at least one embodiment, the second frequency range resides within the first frequency range such that the filter circuit is operable to permit the passage of oscillatory electrical signals in at least two frequency sub-ranges within the first frequency range, the two sub-ranges separated by the second frequency range. In at least one embodiment, the filter includes a second notch filter operable to impede the passage of oscillatory electrical signals in a third frequency range which is within the first frequency range. In at least one embodiment, the filter circuit defines a pre-filter for a wireless internet-service router. In at least one example, the first frequency range includes frequencies between 2400 mega-hertz and 2462 mega-hertz. In another example, the first frequency range includes frequencies between 5150 mega-hertz and 5825 mega-hertz.

The antenna, filter circuit and connector define a unitary construction in at least one embodiment of the antenna assembly. In another embodiment, the antenna and filter circuit define a unitary construction pivotally attached to the connector. In yet another embodiment, the connector and filter circuit define a unitary construction pivotally attached to the antenna.

BRIEF DESCRIPTION OF THE SEVERAL VIEWS OF THE DRAWINGS

Figure 1:
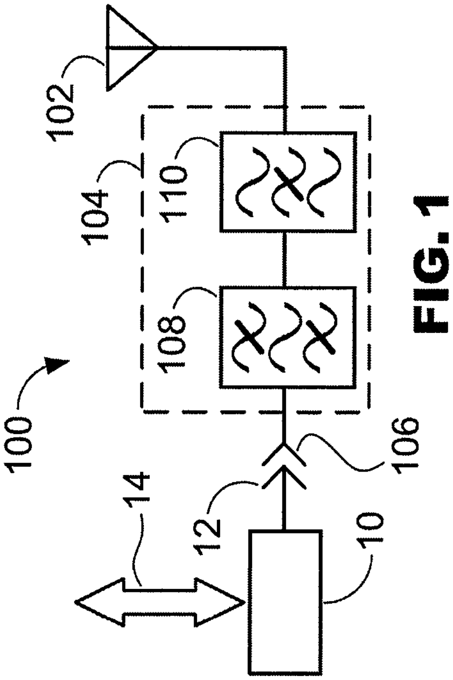
Figure 2:
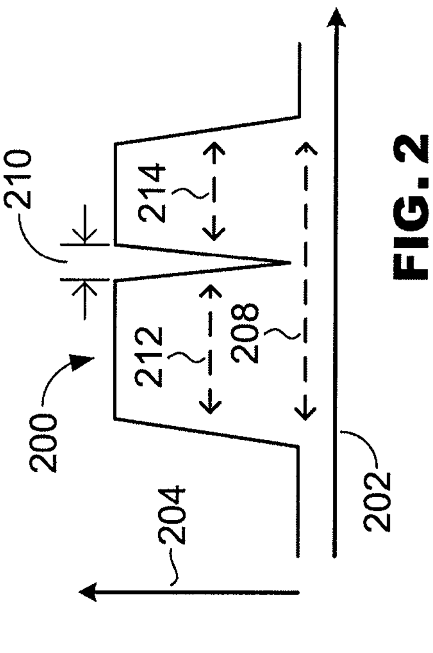
Figure 3:
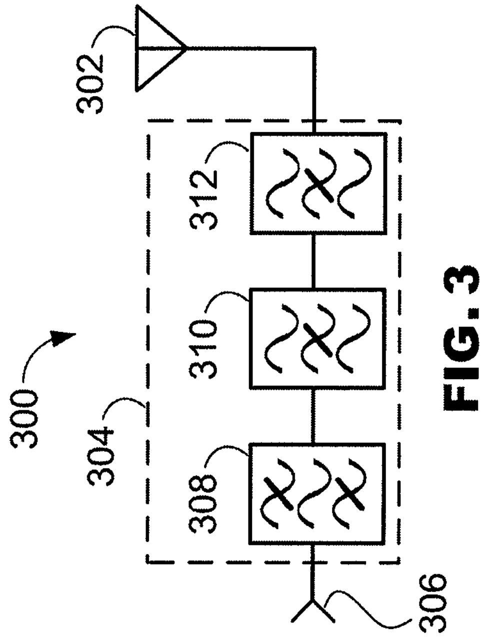
Figure 4:
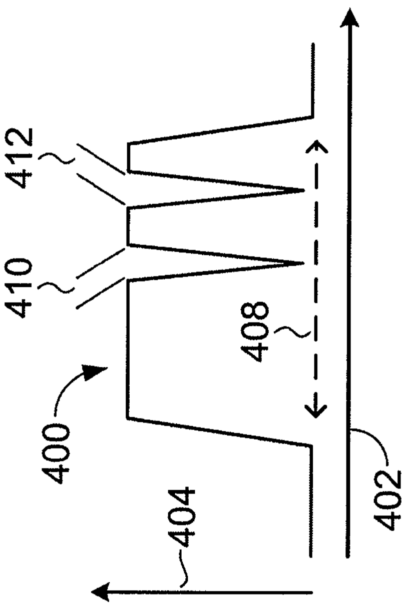
Figure 5:
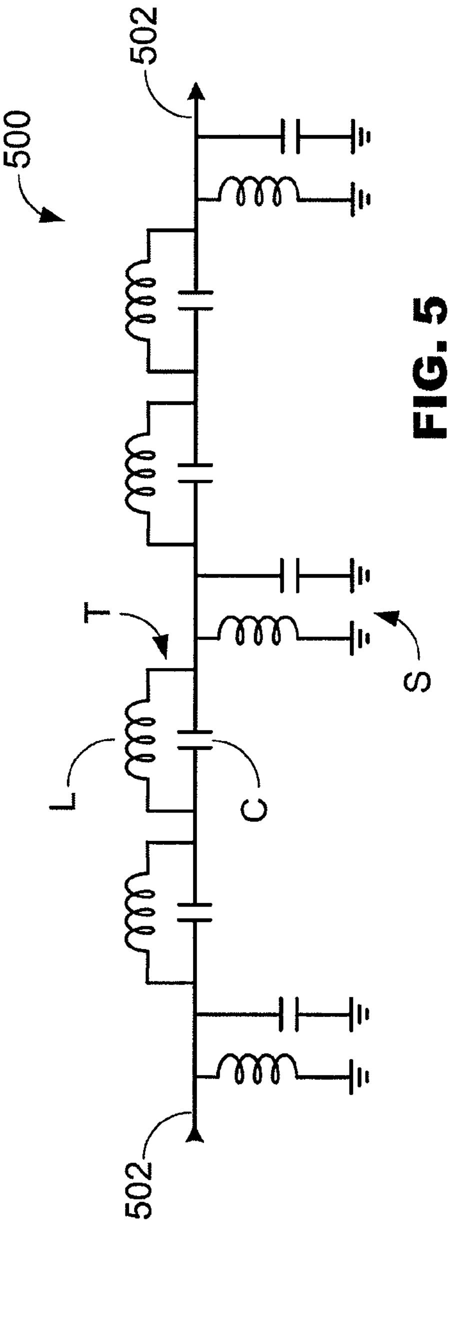
Figure 6:
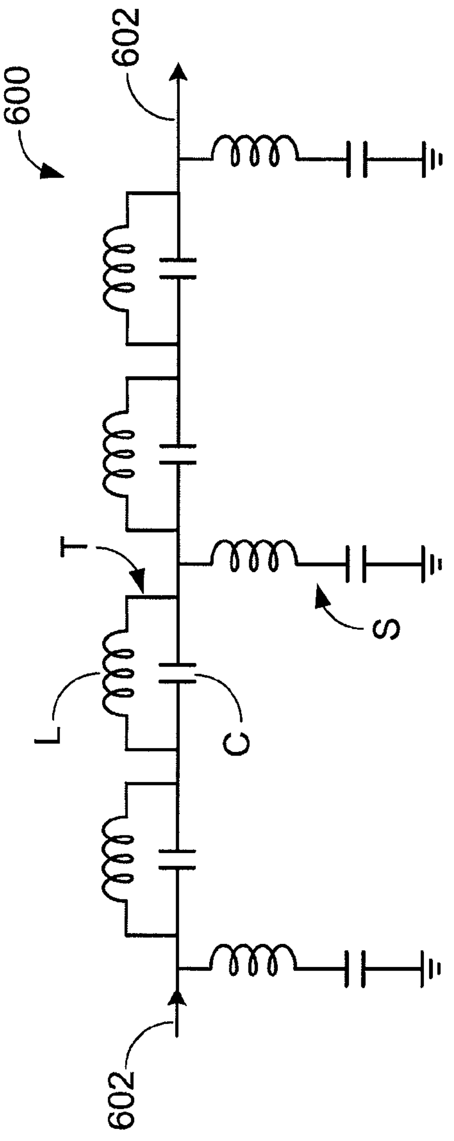
Figure 7:
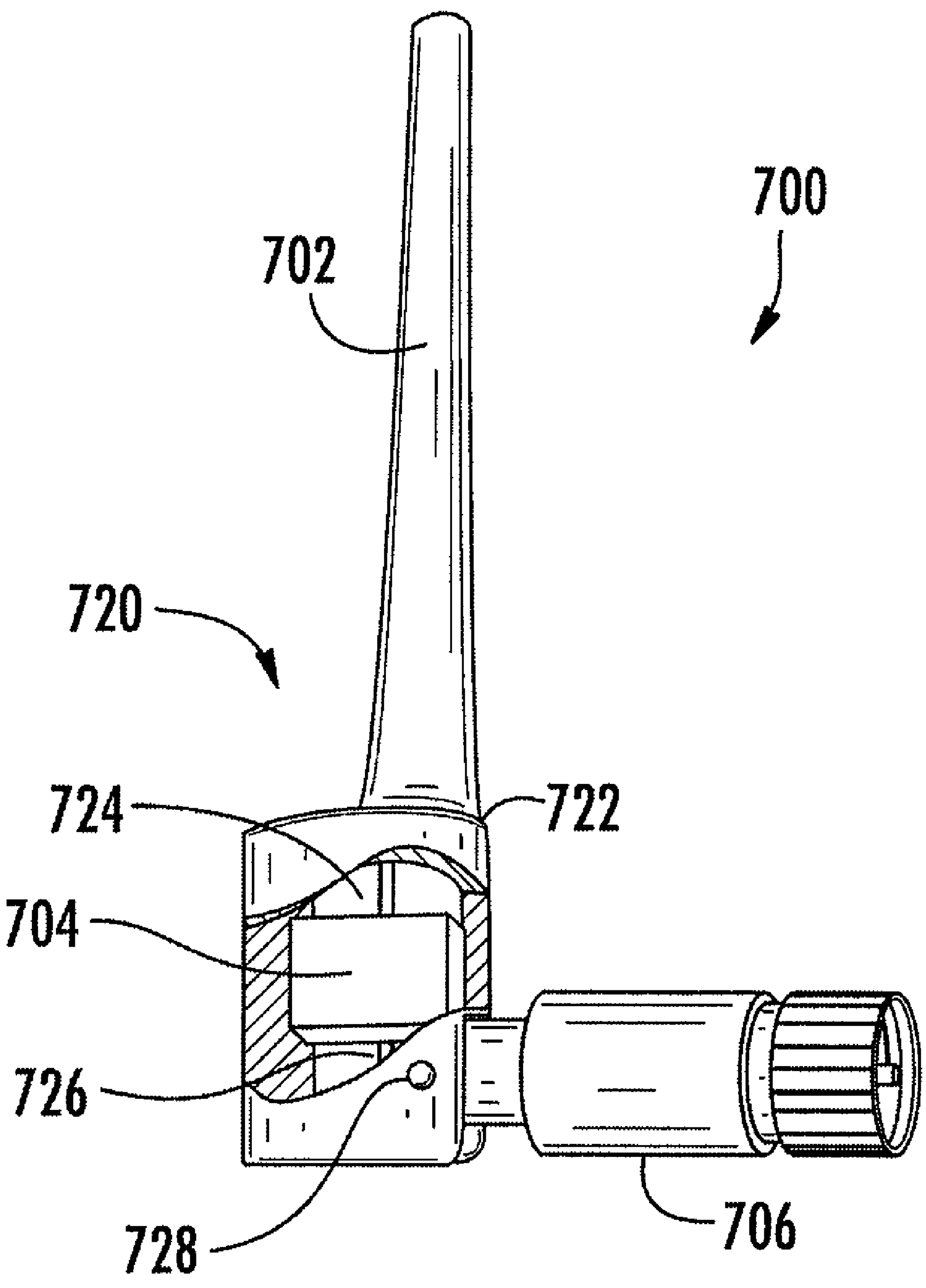
Figure 8:
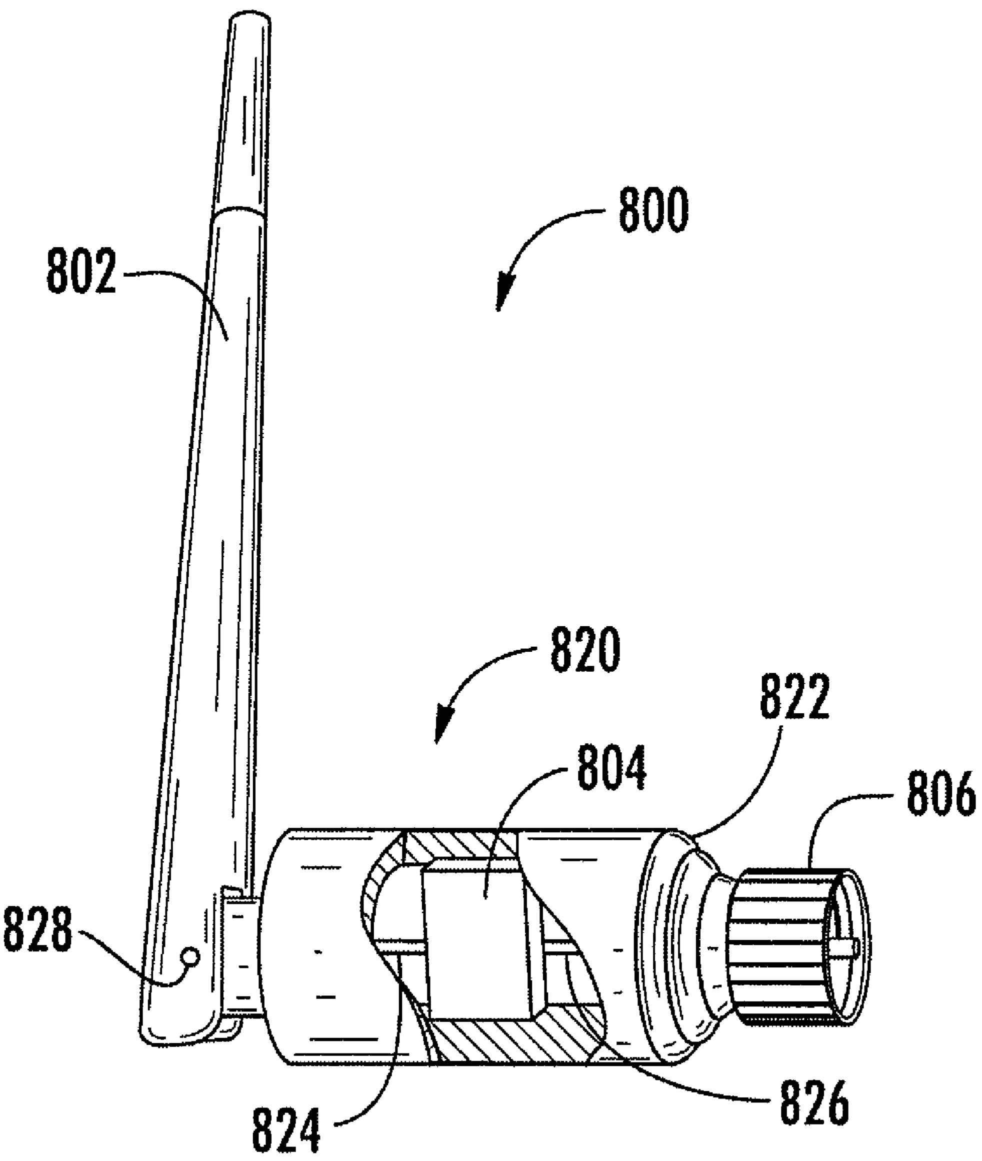

Having thus described the invention in general terms, reference will now be made to the accompanying drawings, which are not necessarily drawn to scale, and wherein:

FIG. 1 is a diagrammatic representation of an antenna assembly having an antenna, a filter circuit, and a connector in accordance with a first embodiment of the invention;

FIG. 2 is a representation of a transmission function of the filter circuit of FIG. 1;

FIG. 3 is a diagrammatic representation of an antenna assembly having an antenna, a filter circuit, and a connector in accordance with a second embodiment of the invention;

FIG. 4 is a representation of a transmission function of the filter circuit of FIG. 3;

FIG. 5 is a diagrammatic representation of an exemplary embodiment of a band-pass filter, which the filter circuits of FIGS. 1 and 3 may include;

FIG. 6 is a diagrammatic representation of an exemplary embodiment of a notch filter, which the filter circuits of FIGS. 1 and 3 may include;

FIG. 7 is a perspective view of an antenna assembly, according to either of the embodiments of FIGS. 1 and 3, in which the antenna and filter circuit define a unitary construction pivotally attached to the connector; and FIG. 8 is a perspective view of an antenna assembly, according to either of the embodiments of FIGS. 1 and 3, in which the connector and filter circuit define a unitary construction pivotally attached to the antenna.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

An antenna assembly 100 in accordance with a first embodiment of the invention is diagrammatically represented in FIG. 1. The antenna assembly 100 includes an antenna 102, a filter circuit 104, and a connector 106. The filter circuit defines a pre-filter for a wireless communications device 10 involved in wireless communications, which may be two-way communications, through the antenna assembly 100. The wireless communications device 10 may include its own on-board filter circuits. Thus, the filter circuit 104 may supplement, improve, or obviate on-board filtering capabilities of the wireless communication device 10. The connector 106 is constructed to engage the connector 12 of the device 10. The connectors 12 and 106 comprise respective electrically conductive contact members through which the device 10 and the antenna assembly 100 are in electrical communication when the connectors are engaged. For example, in at least one embodiment, the connector 106 is a conventional coaxial connector in male configuration that engages the connector 12 which is a conventional coaxial connector in female configuration. In that example, the contact members of the connectors are the centrally disposed conducting members of the conventional coaxial connectors. The connectors may include additional conducting members that engage each other. For example, the connectors may include shield or grounding members such as the outer sleeve portions of conventional coaxial connectors.

The connector 106 is in electrical communication with the antenna 102 through the filter circuit 104. The antenna assembly 100 is generally adapted to facilitate wireless communications of the wireless communications device 10. Accordingly, the filter circuit 104 permits the passage of oscillatory electrical signals, in one or more particular frequency ranges, between the antenna 102 and the contact member of the connector 106. For example, in the illustrated embodiment the filter circuit 104 includes a band-pass filter 108 operable to permit the passage of oscillatory electrical signals in a first frequency range 208 (FIG. 2). The first frequency range may vary among various embodiments of the band-pass filter 108 in order for the communications of various wireless communications devices 10, having various communication frequency ranges, to be facilitated. Signals within any given communication frequency range may be called in-band signals. Signals at frequencies above and below any given communication frequency range may be called out-of-band signals. The band-pass filter 108 permits the passage of signals in the communication frequency range of the wireless communications device 10 and impedes the passage of oscillatory electrical signals outside of that frequency range in order to prevent out-of-band interfering signals from reaching the wireless communications device and to prevent out-of-band signals from being transmitted by the wireless communications device through the antenna. The electrical oscillatory signals received by the antenna may have many frequency components. Impeding signals at any particular frequency relates to entirely blocking signals at that frequency or attenuating signals at that frequency to reduce or suppress their intensities as they propagate across the filter circuit in some diminished amount.

In at least one example, the wireless communications device 10 is a wireless internet-service router operating in the 2400 to 2462 megahertz frequency range and having a conventional coaxial connector 12 for engaging an antenna. In that example, the connector 106 engages the connector 12 and the band-pass filter permits the passage of in-band oscillatory electrical signals in this range between the connector 106 and the antenna 102 while impeding out-of-band signals having frequencies below 2400 megahertz and above 2462 megahertz. Furthermore, in that example, the wireless communications conducted by the device 10 include two-way communications. That is, data can be downloaded from the internet and transmitted from the antenna 102 to a user's computing device, and data to be uploaded to the internet can be received by the antenna 102 from the computing device. In another example, the wireless communications device 10 is a wireless internet-service router operating in the 5150 to 5825 megahertz frequency range and the band-pass filter accordingly permits passage of oscillatory electrical signals in this range between the connector 106 and the antenna 102 while impeding signals having frequencies below 5150 megahertz and above 5825 megahertz. In these examples, the data link 14 in FIG. 1 represents the router's connection to the internet.

The filter circuit 104 may also impede the passage of signals in one or more frequencies or frequency ranges in which interferences are found or known to reside. For example, microwave ovens and cordless telephones may represent in-band interferences in some wireless communication frequency ranges. Accordingly, the filter circuit 104 may impede the passage of signals in the frequencies of such interferences while permitting the passage of signals above and below the interferences. For example, in the illustrated embodiment the filter circuit 104 includes a notch filter 110 operable to impede the passage of oscillatory electrical signals in a second frequency range 210 (FIG. 2). The notch filter 110 is disposed in serial electrical communication with the band-pass filter 108 and works in conjunction with the band-pass filter to facilitate wireless communications of the wireless communications device 10. Accordingly, the second frequency range is chosen within the first frequency range, which includes a wireless communication frequency range of the wireless communications device 10. The second frequency range may vary among various embodiments of the notch filter 110 in order that each embodiment impedes interferences from one or more particular interference sources. Thus, in each particular embodiment of the notch filter, the second frequency is chosen to coincide or encompass the frequencies of interference signals found or known to reside within the wireless communication frequency range of the wireless communications device 10.

By combining the operational effects of the band-pass filter 108 and the notch filter 110, the filter circuit 104 exhibits a transmission function as represented in FIG. 2. The frequency axis 202 represents any frequency domain that includes a communication frequency range of the wireless communications device 10. As varying examples of such wireless communications devices have varying communication frequency ranges, the frequency axis 202 is provided as generic and without particular units. The transmission axis 204 represents the relative intensity of a signal passing through the filter circuit 104 and is also provided without particular units. In the illustrated transmission function 200, the first frequency range 208 permitted by the band-pass filter 108 (FIG. 1) is chosen to correspond to the communication frequency range of a particular wireless communications device 10. Thus, in one example wherein the wireless communications device 10 is a wireless internet-service router operating in the 2400 to 2462 megahertz frequency range, the first frequency range 208 in FIG. 2 is an approximate 2400 to 2462 megahertz frequency range. In another example wherein the wireless communications device 10 is a wireless internet-service router operating in the 5150 to 5825 megahertz frequency range, the first frequency range 208 in FIG. 2 is an approximate 5150 to 5825 megahertz frequency range. The second frequency range 210 illustrated within the first frequency range 208 in FIG. 2 represents a particular frequency impeded by the notch filter 110 (FIG. 1).

The second frequency range 210 (FIG. 2) resides within the first frequency range 208. Thus, the transmission function 200 exhibits two frequency sub-ranges 212 and 214 in which oscillatory electrical signals are passed by the filter circuit 104 (FIG. 1.). The two frequency sub-ranges 212 and 214 are separated by the second frequency range 210. Thus, the notch filter 110 is configured to impede known or found interferences within the communication frequency range of the wireless communications device 10 (FIG. 1). The band-pass filter permits the passage of signals in the first frequency range 208, and the notch filter impedes signals in the second frequency range 210. This corresponds to permitting signals in the communication frequency range of a wireless communications device and impeding interfering signals within that communication frequency range.

An antenna assembly 300 in accordance with another embodiment of the invention is diagrammatically represented in FIG. 3. Like the antenna assembly 100 of FIG. 1, the antenna assembly 300 of FIG. 3 includes an antenna 302, a filter circuit 304, and a connector 306 constructed to engage a wireless communications device. The assemblies 100 and 300 bear many similarities and therefore the preceding descriptions need not be duplicated. The antenna assembly 300 differs from the preceding descriptions in that the filter circuit 304 includes a band-pass filter 308 in serial electrical communication with two notch filters 310 and 312. The band-pass filter 308 permits the passage of oscillatory electrical signals in a first frequency range 408 (FIG. 4), and the two notch filters 310 and 312 impede signals in two respective frequency ranges 410 and 412 (FIG. 4). Thus, the antenna assembly 300 facilitates wireless communications in an environment where interference signals are known or found to reside in the two frequency ranges 410 and 412.

By combining the operational effects of the band-pass filter 308 and the notch filters 310 and 312, the filter circuit 304 exhibits the transmission function 400 represented in FIG. 4. The first frequency range 408 permitted by the band-pass filter 308 extends along the frequency axis 402. Frequency sub-ranges permitted by the filter circuit are represented as rises in the transmission function along the transmission axis 404. Within the first frequency range 408, the transmission function exhibits dips at the frequency ranges 410 and 412 impeded respectively by the notch filters 310 and 312. Thus, the notch filters 310 and 312 are configured to impede known or found interferences within the first frequency range 408. This corresponds to permitting signals in the communication frequency range of a wireless communications device and impeding interfering signals within that communication frequency range.

In view of the filter circuit 104 having a single notch filter 110 in FIG. 1, and in view of the filter circuit 304 having two notch filters 310 and 312 in FIG. 3, it is clear that various embodiments of the invention may include various numbers of notch filters chosen to impede particular interferences in various frequency ranges within the communication frequency range of a wireless communications device. Thus, wireless communications are facilitated in various environments having interfering signals within multiple frequency ranges.

Within the scope of these descriptions, the band-pass filters 108 and 308 may be of various types. For example, the band-pass filters may each be a full transform elliptic band-pass filter 500 as represented in FIG. 5. In FIG. 5, multiple tank elements “T” are in serial communication with each other to define a transmission path 502. Each tank element includes a capacitor “C” and an inductor “L” arranged in parallel communication with each other. Multiple shunt elements S are connected between the transmission path and ground. Each shunt element includes a capacitor and an inductor. To avoid needless repetition, only one inductor “L,” one capacitor “C,” one tank element “T,” and one shunt element “S” are labeled in FIG. 5. The band-pass filter 500 can be understood to: permit the passage of oscillatory electrical signals in a particular frequency range along the transmission path according to resonances in the tank elements; and, impede signals above and below that particular frequency range as low and high frequency signals are shunted to ground respectively by the inductors and capacitors of the shunt elements. The capacitance values of the capacitors and the inductance values of the inductors may be chosen in the making of any particular band-pass filter to permit passage of signals along the transmission path in a desired particular frequency range, which relates to the first frequency ranges 208 and 408 in FIGS. 2 and 4. The full transform elliptic band-pass filter 500 in FIG. 5 merely represents an example. The band-pass filters 108 and 308 may each be among other types of band-pass filters.

Furthermore, within the scope of these descriptions, the notch filters 110, 310 and 312 may be of various types. For example, the notch filters may each be a full transform elliptic notch filter 600 as represented in FIG. 6. In FIG. 6, multiple tank elements “T” are in serial communication with each other to define a transmission path 602. Each tank element includes a capacitor “C” and an inductor “L” arranged in parallel communication with each other. Multiple shunt elements S are connected between the transmission path and ground. Each shunt element includes a capacitor and an inductor in serial electrical communication with each other. To avoid needless repetition, only one inductor “L,” one capacitor “C,” one tank element “T,” and one shunt element “S” are labeled in FIG. 6. The notch filter 600 can be understood to: permit the passage of low-frequency oscillatory electrical signals along the transmission path by way of the inductors of the tank elements; permit the passage of high-frequency oscillatory electrical signals along the transmission path by way of the capacitors of the tank elements; and, impede signals in a particular frequency range according to resonances in the shunt elements which shunt signals in that range from the transmission path to ground. The capacitance values of the capacitors and the inductance values of the inductors may be chosen in the making of any particular notch filter to impede signals in a desired particular frequency range, which relates to the frequency ranges 210, 410, and 412 in FIGS. 2 and 4. The full transform elliptic notch filter 600 in FIG. 6 merely represents an example. The notch filters 110, 310 and 312 may each be among other types of notch filters.

Regarding either of FIGS. 1 and 3, any particular filter circuit (104, 304) constructed in accordance with an embodiment of the invention may be constructed as a miniaturized filter circuit for minimizing the size of any of the described unitary constructions. This is advantageous toward providing an antenna assembly having an integral filter in a compact unit, which may include a pivoting joint. The filter circuit may be manufactured according to Micro-Electro-Mechanical Systems (MEMS) fabrication techniques and accordingly may be provided at a size that is advantageously small in comparison to typical earlier filter circuits.

Again regarding either of FIGS. 1 and 3, the antenna assembly (100, 300) advantageously filters out unwanted interference signals before such signals enter the device with which the antenna assembly is engaged. The band-pass filter (108, 308) impedes out-of-band signals with regard to the communication frequency range of the engaged device, and one or more notch filters (110, 310, 312) impede in-band interferences. Advantageously, the engagement of the antenna assembly with a device is conveniently accomplished using a single connector (106, 306).

Furthermore, regarding either of FIGS. 1 and 3, according to at least one embodiment of the invention, the antenna (102, 302), the filter circuit (104, 304), and the connector (106, 306) define a unitary construction for convenience of handling and use. In an exemplary scenario, a user grasps the unitary construction and engages the connector thereof with a wireless communications device 10 (FIG. 1). The engagement disposes the contact member of the connector (106,306) into electrical communication with a corresponding contact member of the connector 12 of the wireless communications device. The wireless communications device then at least receives wireless communications through the antenna assembly (100, 300) while benefiting from the operational effects of the filter circuit (104, 304), and while benefiting from the convenience, elegance, and simplicity of a unitary construction. This embodiment may be particularly advantageous for use with hand-held radios. It should be understood that these descriptions relate to a wireless communications device that both receives and transmits wireless communications through the antenna assembly (100, 300).

Furthermore yet, regarding either of FIGS. 1 and 3, according to at least one other embodiment of the invention, the antenna (102, 302) and the filter circuit (104, 304) define a unitary construction pivotally attached to the connector (106, 306). An exemplary embodiment of such an antenna assembly is shown in FIG. 7. The antenna assembly 700 includes a unitary construction 720 pivotally attached to the connector 706. The unitary construction is defined by the antenna 702 and the filter circuit 704, which are disposed within a common housing 722. In this exemplary embodiment: the antenna 702 relates to the antennas 102 (FIG. 1) and 302 (FIG. 2); the filter circuit 704 relates to the filter circuits 104 (FIG. 1) and 304 (FIG. 3); and the connector 706 relates to the connectors 106 (FIG. 1) and 306 (FIG. 2). Within the housing 722, the filter circuit 704 contacts the housing for grounding purposes, such as for shunting signals filtered from the transmission path defined across the filter circuit between the pins 724 and 726 by which the filter circuit maintains electrical contact with the antenna 702 and connector 706, respectively. The pins 724 and 726 respectively represent signal input and output pins of the filter circuit when the antenna assembly 700 receives wireless signals through the antenna. Conversely, the pins 724 and 726 respectively represent signal output and input pins of the filter circuit when the antenna assembly transmits wireless signals from the antenna. The unitary construction 720 pivots about a hinge pin 728 relative to the connector 706 to permit adjustment of the disposition of the antenna 702. This exemplary embodiment may be particularly advantageous for use in an environment where varying the disposition of the antenna may promote signal strength or reduce interferences.

Moreover, in at least one other embodiment of the invention, the connector (106, 306) and the filter circuit (104, 304) define a unitary construction pivotally attached to the antenna (102, 302). An exemplary embodiment of such an antenna assembly is shown in FIG. 8. The antenna assembly 800 includes a unitary construction 820 pivotally attached to the antenna 802. The unitary construction is defined by the connector 806 and the filter circuit 804, which are disposed within a common housing 822. In this exemplary embodiment: the antenna 802 relates to the antennas 102 (FIG. 1) and 302 (FIG. 2); the filter circuit 804 relates to the filter circuits 104 (FIG. 1) and 304 (FIG. 3); and the connector 806 relates to the connectors 106 (FIG. 1) and 306 (FIG. 2). Within the housing 822, the filter circuit 804 contacts the housing for grounding purposes, such as for shunting signals filtered from the transmission path defined across the filter circuit between the pins 824 and 826 by which the filter circuit maintains electrical contact with the antenna 802 and connector 806, respectively. The pins 824 and 826 respectively represent signal input and output pins of the filter circuit when the antenna assembly 800 receives wireless signals through the antenna. Conversely, the pins 824 and 826 respectively represent signal output and input pins of the filter circuit when the antenna assembly transmits wireless signals from the antenna. The unitary construction 820 pivots about a hinge pin 828 relative to the antenna 802 to permit adjustment of the disposition of the antenna 802. Like that of FIG. 7, the exemplary embodiment of FIG. 8 may be particularly advantageous for use in an environment where varying the disposition of the antenna may promote signal strength or reduce interferences.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An antenna assembly for a wireless communications device, the antenna assembly comprising:

an antenna for wirelessly receiving data;

a filter circuit in electrical communication with the antenna;

a connector in electrical communication with the filter circuit, the connector constructed to dispose a wireless communications device into electrical communication with the filter circuit by engaging the wireless communications device;

whereby when the connector is in engagement with the wireless communications device the received data is provided to the wireless communications device by way of the filter circuit and the connector; and wherein the filter circuit comprises a band-pass filter and a first notch filter disposed in serial electrical communication with the band-pass filter, the band-pass filter operable to permit the passage of oscillatory electrical signals between the antenna and the connector in a first frequency range, the first notch filter operable to impede the passage of oscillatory electrical signals between the antenna and the connector in a second frequency range, the second frequency range residing within the first frequency range.

2. An antenna assembly according to claim 1, the filter circuit comprising a band-pass filter operable to permit the passage of oscillatory electrical signals between the antenna and the connector in a particular frequency range.

3. An antenna assembly according to claim 1, the filter circuit comprising a notch filter operable to impede the passage of oscillatory electrical signals between the antenna and the connector in a particular frequency range.

4. An antenna assembly according to claim 1, the second frequency range residing within the first frequency range such that the filter circuit is operable to permit the passage of oscillatory electrical signals in at least two frequency sub-ranges within the first frequency range, the two sub-ranges separated by the second frequency range.

5. An antenna assembly according to claim 1, comprising a second notch filter, the second notch filter disposed in serial electrical communication with at least one of the band-pass filter and the first notch filter, the second notch filter operable to impede the passage of oscillatory electrical signals between the antenna and the connector in a third frequency range, the third frequency range residing within the first frequency range.

6. An antenna assembly according to claim 1, the first frequency range including frequencies between 2400 mega-hertz and 2462 mega-hertz.

7. An antenna assembly according to claim 1, the first frequency range including frequencies between 5150 mega-hertz and 5825 mega-hertz.

8. An antenna assembly according to claim 1, the connector constructed to mount onto an antenna-connector of a wireless internet-service router.

9. An antenna assembly according to claim 1, the filter circuit defining a pre-filter for a wireless internet-service router.

10. An antenna assembly according to claim 1, the antenna and filter circuit defining a unitary construction pivotally attached to the connector.

11. An antenna assembly according to claim 1, the connector and filter circuit defining a unitary construction pivotally attached to the antenna.

12. An antenna assembly according to claim 1, the antenna, filter circuit and connector defining a unitary construction.

* * * * *